US008618388B2

(12) United States Patent
Stevens

(10) Patent No.: US 8,618,388 B2
(45) Date of Patent: Dec. 31, 2013

(54) BEARING AND SHAFT ASSEMBLIES, INCLUDING TUNING KEYS AND TUNER ASSEMBLIES FOR STRINGED INSTRUMENTS, METHODS OF USING BEARING AND SHAFT ASSEMBLIES, AND METHODS OF MAKING BEARING AND SHAFT ASSEMBLIES

(71) Applicant: Lowell Stevens, Farmington, UT (US)

(72) Inventor: Lowell Stevens, Farmington, UT (US)

( * ) Notice: Subject to any disclaimer, the term of this patent is extended or adjusted under 35 U.S.C. 154(b) by 0 days.

(21) Appl. No.: 13/730,492

(22) Filed: Dec. 28, 2012

(65) Prior Publication Data

US 2013/0167706 A1 Jul. 4, 2013

Related U.S. Application Data

(60) Provisional application No. 61/582,038, filed on Dec. 30, 2011.

(51) Int. Cl.
*G10D 3/14* (2006.01)

(52) U.S. Cl.
USPC .......................................................... 84/304

(58) Field of Classification Search
None
See application file for complete search history.

(56) References Cited

U.S. PATENT DOCUMENTS

| 2,558,059 | A |   | 6/1951  | Nyhagen |
| 3,006,447 | A | * | 10/1961 | Irwin ............................ 192/45.1 |
| 3,100,404 | A | * | 8/1963  | Boeddeker et al. .............. 74/553 |
| 3,355,628 | A | * | 11/1967 | Tronca ........................... 338/132 |
| 3,459,092 | A | * | 8/1969  | Thompson ....................... 84/305 |
| 3,512,427 | A | * | 5/1970  | Metcalf ........................ 74/471 R |
| 3,554,337 | A | * | 1/1971  | Denkowski ................. 192/223.2 |
| 3,597,717 | A | * | 8/1971  | Kent .............................. 338/131 |
| 3,726,172 | A | * | 4/1973  | Sorkin ............................ 84/304 |
| 3,986,409 | A | * | 10/1976 | Tripp et al. ...................... 74/548 |
| 4,005,628 | A |   | 2/1977  | Darling |
| 4,026,182 | A | * | 5/1977  | Gilbrech ......................... 84/305 |
| 4,058,192 | A | * | 11/1977 | Haigh ............................. 192/46 |
| 4,077,503 | A | * | 3/1978  | Lieberman et al. .......... 192/18 R |
| 4,131,033 | A | * | 12/1978 | Wright et al. ................... 74/553 |
| 4,222,473 | A | * | 9/1980  | Kopich ........................ 192/43.1 |
| 4,269,119 | A | * | 5/1981  | Strausburg .................... 101/111 |
| 4,365,231 | A | * | 12/1982 | Nishioka ........................ 338/334 |
| 4,403,523 | A | * | 9/1983  | Seger .............................. 74/128 |
| 4,821,856 | A | * | 4/1989  | Lederman .................. 192/45.01 |
| 4,828,086 | A | * | 5/1989  | Lederman ................ 192/45.009 |
| 5,127,284 | A | * | 7/1992  | Jorgensen ....................... 74/523 |
| 5,384,442 | A | * | 1/1995  | Danner .......................... 200/566 |
| 5,463,924 | A | * | 11/1995 | Reuterfors ...................... 84/304 |
| 5,918,715 | A | * | 7/1999  | Ruth et al. ....................... 192/46 |
| 5,937,981 | A | * | 8/1999  | Adams et al. .................... 192/44 |

(Continued)

*Primary Examiner* — Robert W Horn
(74) *Attorney, Agent, or Firm* — Loza & Loza, LLP; Tyler J. Barrett

(57) ABSTRACT

Bearing and shaft assemblies include a shaft with at least one depressed region. A first one-way bearing can be positioned on the shaft in a manner such that the first one-way bearing facilitates clockwise rotation and resists counterclockwise rotation. A second one-way bearing can be positioned on the shaft in a manner such that the second one-way bearing facilitates rotation in the second direction and resists rotation in the first direction. The first one-way bearing and the second one-way bearing can be displaced axially along the shaft so the first one-way bearing, the second one-way bearing, or both one-way bearings is/are positioned around the one or more depressed regions of the shaft to facilitate rotation in one direction, both directions or neither direction, as described herein. Other aspects, embodiments, and features are also included.

20 Claims, 11 Drawing Sheets

(56) References Cited

U.S. PATENT DOCUMENTS

| | | | |
|---|---|---|---|
| 5,967,301 A * | 10/1999 | Reed et al. | 200/523 |
| 6,362,538 B1 * | 3/2002 | Reed et al. | 307/10.1 |
| 7,102,065 B2 * | 9/2006 | Sperzel | 84/304 |
| 7,659,466 B1 * | 2/2010 | Jang | 84/304 |
| 7,661,518 B2 * | 2/2010 | Kimes | 192/46 |
| 7,721,860 B2 * | 5/2010 | Saka | 192/43.1 |
| 7,766,790 B2 * | 8/2010 | Stevenson et al. | 477/8 |
| 8,307,968 B2 * | 11/2012 | Yamane | 192/45.1 |
| 8,344,232 B2 * | 1/2013 | Booth | 84/304 |
| 8,365,890 B2 * | 2/2013 | Tamura | 192/45.019 |
| 8,448,767 B2 * | 5/2013 | Ando | 192/45.008 |
| 2003/0070529 A1 * | 4/2003 | Hovermann et al. | 84/304 |
| 2013/0167706 A1 * | 7/2013 | Stevens | 84/312 R |

* cited by examiner

BEARING AND SHAFT ASSEMBLIES, INCLUDING TUNING KEYS AND TUNER ASSEMBLIES FOR STRINGED INSTRUMENTS, METHODS OF USING BEARING AND SHAFT ASSEMBLIES, AND METHODS OF MAKING BEARING AND SHAFT ASSEMBLIES

CLAIM OF PRIORITY UNDER 35 U.S.C. §119

The present Application for Patent claims priority to Provisional Application No. 61/582,038 entitled "Tuning Keys and Tuner Assemblies for Stringed Instruments, Methods of Using Tuning Keys and Methods of Making Tuning Keys and Tuner Assemblies for Stringed Instruments" filed Dec. 30, 2011, the entire disclosure of which is hereby expressly incorporated by reference herein.

TECHNICAL FIELD

The present disclosure relates generally to a bearing and shaft configurations employable in various mechanical assemblies. More particularly, the present disclosure relates to apparatus and methods associated with bearing and shaft assemblies.

BACKGROUND

A variety of different mechanical assemblies include, or may benefit from, an ability to freely rotate clockwise and/or counterclockwise relative to a shaft, while also being capable of locking to the shaft. In some instances, a ratchet assembly may be employed for such assemblies, where a gear having a plurality of gear teeth are adapted to engage a stopper mechanism to resist rotation in a first direction, while allowing rotation in the an opposite, second direction. In some instances, such a ratchet assembly using a gear can be switched to enable rotation in the first direction while inhibiting rotation in the second direction. Such conventional ratchet assemblies can exhibit various drawbacks in some applications. Accordingly, improvements for such mechanical assemblies may be desirable.

BRIEF SUMMARY OF SOME EXAMPLES

One or more aspects of the present disclosure include assemblies with one or more shaft and bearing configurations. In at least one example, a shaft and bearing assembly may include a shaft with one or more depressed regions. A first one-way bearing may be disposed on the shaft with the first one-way bearing positioned to facilitate rotation in a first direction and to resist rotation in an opposing second direction. A second one-way bearing may also be disposed on the shaft with the second one-way bearing positioned to facilitate rotation in the second direction and to resist rotation in the first direction.

In some examples of shaft and bearing assemblies, the shaft may be disposed within an aperture of a tuning key (e.g., a tuning knob, a knob, a tuner, a peg, a tuning peg, etc) adapted for use with a stringed instrument. A capstan may also be included and operably coupled with the tuning key to facilitate rotational turning of the capstan in response to rotation of the tuning key. For example, the shaft may include a worm gear operably coupled to a gear wheel coupled with the capstan to rotate the gear wheel and capstan in response to rotation of the shaft.

Further aspects of the present disclosure include methods of operation for shaft and bearing assemblies. According to at least one example, such methods may include displacing a first one-way bearing and a second one-way bearing on a shaft so the first one-way bearing and the second one-way bearing are positioned over one or more depressed regions or grooves of the shaft. With both one-way bearings positioned over at least one depressed region, the shaft may be rotated relative to the one-way bearings in a first direction and an opposing second direction. The first one-way bearing and the second one-way bearing may further be displaced on the shaft so at least a portion of the first one-way bearing is not located over a depressed region of the shaft and at least a portion of the second one-way bearing is also not located over a depressed region of the shaft. In this configuration, rotation of the shaft relative to the one-way bearings may be inhibited.

Yet additional aspects of the present disclosure include methods of making a shaft and bearing assembly. One or more implementations of such methods may include forming a shaft with at least one depressed region. A first one-way bearing may be disposed on the shaft so that the first one-way bearing facilitates rotation in a first direction and resists rotation in an opposing second direction. A second one-way bearing may also be disposed on the shaft so that the second one-way bearing facilitates rotation in the second direction and resists rotation in the first direction.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details.

The illustrations presented herein are, in some instances, not actual views of any particular, shaft, one-way bearing, tuning key, or stringed instrument, but are merely idealized representations which are employed to describe various features associated with the present disclosure. Additionally, elements common between figures may retain the same numerical designation.

Figure 1:
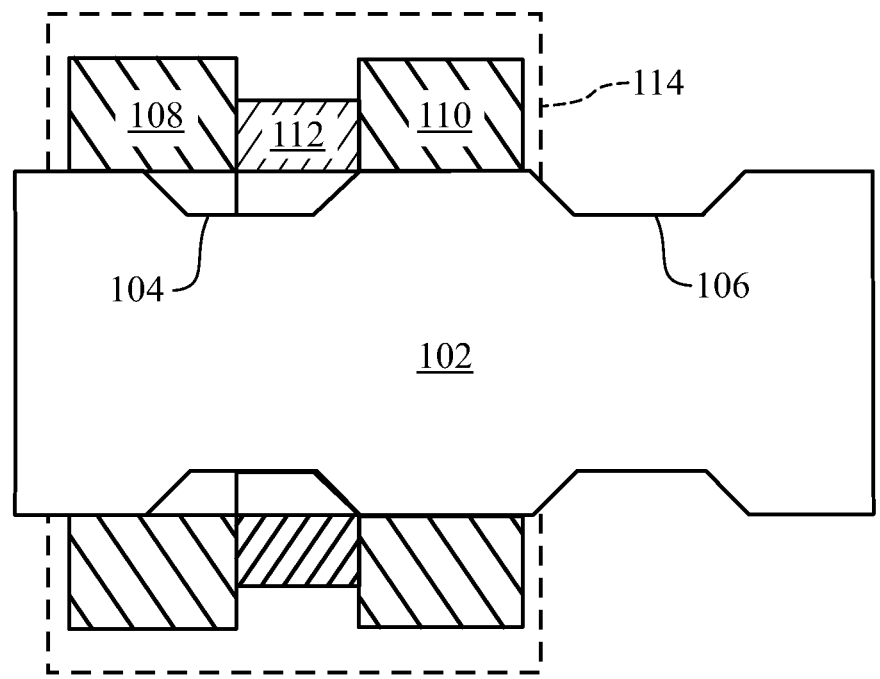
FIG. 1 is a cross-section block diagram of a shaft and bearing assembly according to at least one example.

Various aspects of the present disclosure relate to a shaft and bearing assembly adapted to facilitate rotation of the shaft in one direction, while also enabling the shaft to resist rotation in the opposite direction. FIG. 1 is a cross-section block diagram of a shaft and bearing assembly according to at least one example of the present disclosure. According to an aspect of the present disclosure, a shaft 102 is included with one or more depressed regions or grooves. As shown in FIG. 1, the shaft 102 includes a first depressed region 104 and a second depressed region 106. A first one-way bearing 108 and a second one-way bearing 110 are disposed on the shaft. The first and second one-way bearings 108, 110 are positioned to encircle the shaft 102, and cross-sectioned portions of each one-way bearing are shown on the top and bottom of the shaft 102. In some examples, the first and second one-way bearings 108, 110 can be separated by a spacer 112 positioned between the two one-way bearings. The spacer 112 may be a simple ring positioned to space the first and second one-way bearings 108, 110. In some examples, the spacer 112 may be a conventional bearing (e.g., roller bearing, ball bearing) that is adapted to rotate in all directions, a washer, or some other suitable spacer.

The shaft 102 can be formed of any suitable material according to the particular application. By way of example and not limitation, the shaft may comprise a metal, a metal alloy, a polymer, a wood, or any other material or combination of materials suitable for a shaft according to a particular application. Generally speaking, the first depressed region 104 and the second depressed region 106 comprise an area of the shaft 102 where the outer diameter is smaller than the outer diameter of other portions of the shaft 102. Although these depressed regions 104, 106 are shown in the figures as a substantial reduction in the outer diameter, such a reduction in the outer diameter may be relatively small. For instance, the reduction in the outer diameter for forming the depressed regions 104, 106 may be between 0.003 and 0.012 inches, by way of a non-limiting example. In at least some examples, the transition from the larger outer diameter to the depressed regions 104, 106 can be sloped, as shown in the figures. This slope can facilitate movement of the first and second one-way bearings 108, 110 axially on the shaft 102.

The first and second one-way bearings 108, 110 are adapted to facilitate rotation in one direction and to resist rotation in the opposite direction. By way of example, the first and second one-way bearings 108, 110 may each be a type of one-way bearing referred to by those of ordinary skill in the art as a "sprag clutch." According to a feature of the disclosure, the first and second one-way bearings 108, 110 are positioned on the shaft 102 with each one-way bearing 108, 110 positioned to facilitate rotation in opposite directions and to resist rotation in opposite directions. In other words, the first one-way bearing 108 is positioned on the shaft 102 to facilitate rotation in a first direction (e.g., clockwise) and to resist or inhibit rotation in an opposing second direction (e.g., counterclockwise). On the other hand, the second one-way bearing 110 is positioned about the shaft 102 to resist or inhibit rotation in the first direction (e.g., clockwise) and to facilitate rotation in the opposing second direction (e.g., counterclockwise). Throughout the remainder of the present disclosure, the first direction will be referred to as clockwise and the second direction as counterclockwise. Those of ordinary skill in the art will understand that such terms will not be limiting to the disclosure.

In this manner, when both of the one-way bearings 108, 110 are positioned at least partially around the larger diameter portion of the shaft 102, as shown in FIG. 1, the two one-way bearings 108, 110 will inhibit rotation of the shaft 102. In other words, when the first one-way bearing 108 and the second one-way bearing 110 are displaced axially on the shaft so that both are not positioned around a depressed region, but are positioned to at least partially contact or engage the shaft 102, each one-way bearing 108, 110 will inhibit rotation of the shaft 102 in a respective direction. This is a result of the two one-way bearings 108, 110 being disposed on the shaft 102 to facilitate rotation in opposite directions and to resist rotation in opposite directions.

When the shaft 102 is rotated clockwise, the first one-way bearing 108 facilitates rotation of the shaft 102, but the second one-way bearing 110 resists the clockwise rotation. Similarly, when the shaft 102 is rotated counterclockwise, the second one-way bearing 110 facilitates rotation of the shaft 102, but the first one-way bearing 108 resists the counterclockwise rotation. Accordingly, an apparatus (not shown) coupled with the two one-way bearings 108, 110 can rotate in either direction in response to rotation of the shaft 102. Likewise, rotation in either direction of an apparatus coupled with the two one-way bearings 108, 110 can rotate the shaft 102 in the same direction. In still other examples, the shaft 102 may simply be inhibited from rotation in either direction, and no apparatus may be rotated.

Figure 2:
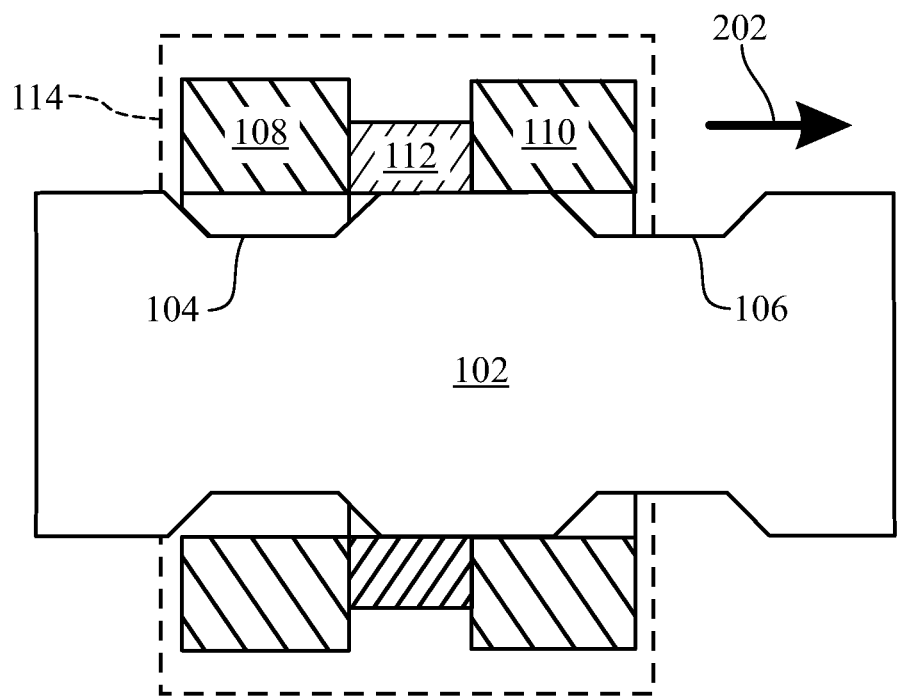
FIG. 2 is a cross-section block diagram of the shaft and bearing assembly of FIG. 1 with a first one-way bearing disposed over a depressed region.

Referring to FIG. 2, the first and second one-way bearings 108, 110 can be displaced axially on the shaft 102. In one example, the first and second one-way bearings 108, 110 may be moved in the direction of arrow 202 and/or the shaft 102 may be moved in a direction opposite the arrow 202. As shown, the first one-way bearing 108 can be positioned at least substantially around a depressed region, such as the first depressed region 104. When the first one-way bearing 108 is positioned at least substantially around a depressed region, at least part of the second one-way bearing 110 is still in contact with the shaft 102. In this instance, the shaft 102 will be free to rotate counterclockwise, since the second one-way bearing 110 is positioned on the shaft 102 to facilitate counterclockwise rotation. That is, the shaft 102 can rotate in the counterclockwise direction without rotating the one-way bearings 108, 110 and/or an apparatus coupled with the one-way bearings 108, 110. Likewise, an apparatus coupled with the two one-way bearings 108, 110 can be rotated clockwise without rotating the shaft 102.

When the shaft 102 is rotated in the clockwise direction, the second one-way bearing 110 resists the clockwise rotation of the shaft 102. In some examples, an apparatus coupled to the one-way bearings 108, 110 can be rotated clockwise in response to clockwise rotation of the shaft 102. In other examples, the shaft 102 can be rotated in the counterclockwise direction in response to counterclockwise rotation of an apparatus coupled to the one-way bearings 108, 110. In still other examples, the shaft 102 may be inhibited (e.g., locked) from clockwise rotation.

Figure 3:
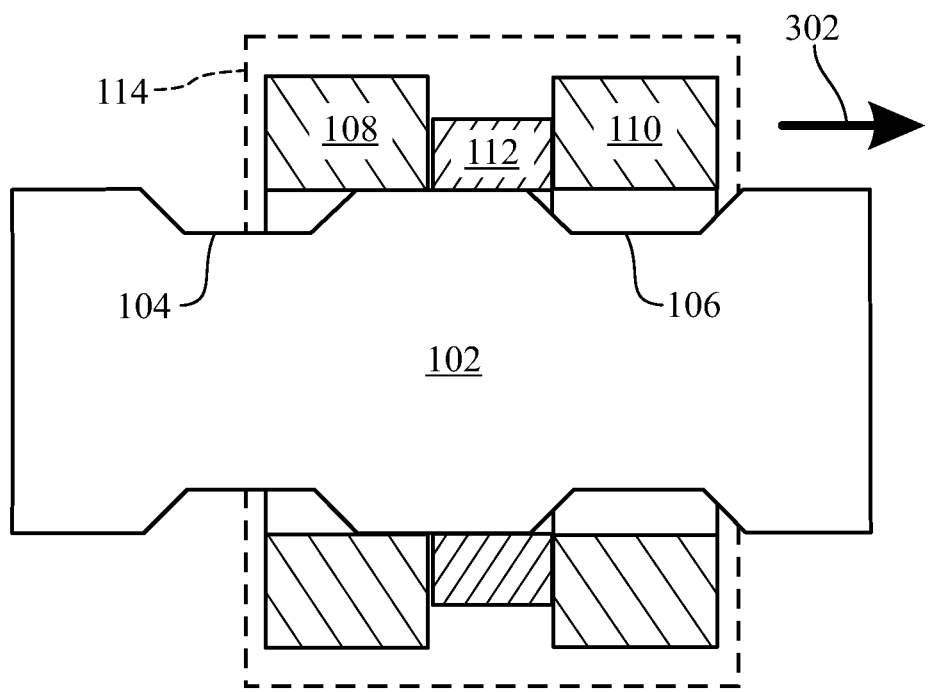
FIG. 3 is a cross-section block diagram of the shaft and bearing assembly of FIG. 1 with a second one-way bearing disposed over a depressed region.

Referring to FIG. 3, the first and second one-way bearings 108, 110 can be displaced axially on the shaft 102 until the second one-way bearing 110 is positioned at least substantially around a depressed region. In one example, the first and second one-way bearings 108, 110 may be moved in the direction of arrow 302 and/or the shaft 102 may be moved in a direction opposite the arrow 302. As shown, the second one-way bearing 110 can be positioned at least substantially around a depressed region, such as the second depressed region 106. When the second one-way bearing 110 is positioned at least substantially around a depressed region, at least part of the first one-way bearing 108 is in contact with the shaft 102. In this instance, the shaft 102 will be free to rotate clockwise, since the first one-way bearing 108 is positioned to facilitate clockwise rotation, and the second one-way bearing 110 is not contacting the shaft 102. That is, the shaft 102 can rotate clockwise without rotating the one-way bearings 108, 110 and/or an apparatus coupled with the one-way bearings 108, 110. Likewise, an apparatus coupled with the two one-way bearings 108, 110 can rotate counterclockwise without rotating the shaft 102.

When the shaft 102 is rotated counterclockwise, the first one-way bearing 108 resists the counterclockwise rotation of the shaft 102. In some examples, an apparatus coupled to the one-way bearings 108, 110 can be rotated counterclockwise in response to counterclockwise rotation of the shaft 102. In other examples, the shaft 102 can be rotated clockwise in response to clockwise rotation of an apparatus coupled to the one-way bearings 108, 110. In still other examples, the shaft 102 may be inhibited (e.g., locked) from counterclockwise rotation.

According to a feature of the disclosure, the first one-way bearing 108 and the second one-way bearing 110 can be disposed in a single housing 114 shown as an optional feature by broken lines in FIG. 1-3. In such instances, the first and second one-way bearings 108, 110 can be packaged as a single bearing assembly. Implementations employing a single housing 114 may include the spacer 112, or may not include a separate spacer 112, since the one-way bearings 108, 110 can be positioned and spaced in the housing 114 as desired. A bearing assembly employing the housing 114 at least substantially enclosing the first one-way bearing 108 and the second one-way bearing 110 may be referred to as a two-way locking bearing.

In the various examples described above, other components may be included. For example, in some instances a respective bearing (e.g., roller, ball) adapted to rotate in all directions may be positioned adjacent to each of the first one-way bearing 108 and the second one-way bearing 110. Such bearings may provide support for the respective first and second one-way bearings 108, 110 as they move into and out of the depressed regions 104, 106.

Figure 4:
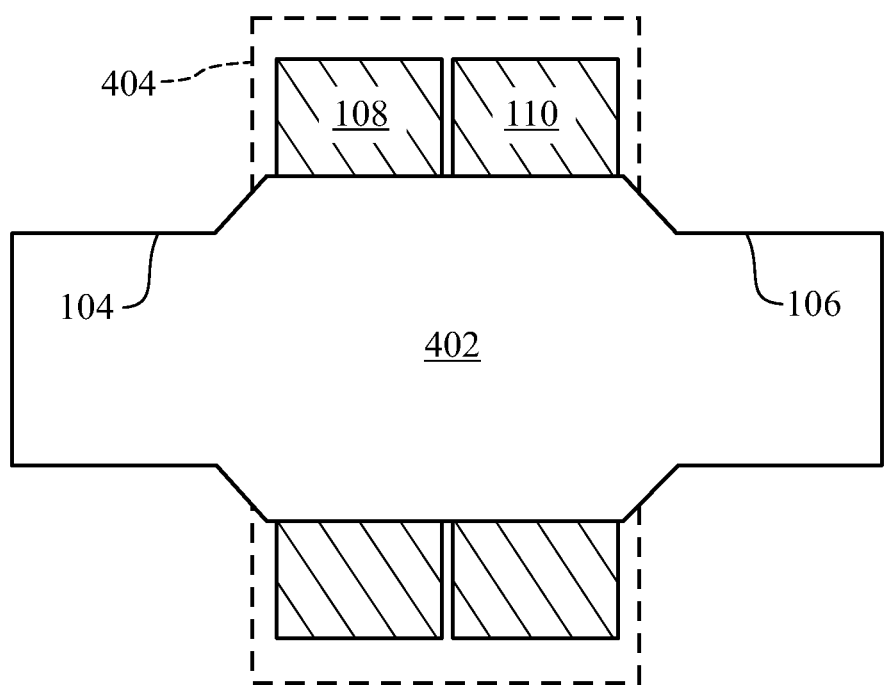
FIG. 4 is a cross-section block diagram of a shaft and bearing assembly according to at least one example.

Turning to FIG. 4, another example is shown for a shaft 402. In this example, the shaft 402 can be configured with the first depressed region 104 and the second depressed region 106 positioned on the outer sides of the first and second one-way bearings 108, 110. In this example, there may not be a spacer between the first and second one-way bearings 108, 110. In some examples, a support bearing (e.g., roller, ball) adapted to rotated in all directions may be positioned adjacent to each of the first one-way bearing 108 and the second one-way bearing 110 to provide support for the respective first and second one-way bearings 108, 110 as they move into and out of the depressed regions 104, 106.

In the example shown in FIG. 4, with both of the one-way bearings 108, 110 positioned at least partially around the larger diameter portion of the shaft 402, the two one-way bearings 108, 110 will inhibit rotation of the shaft 402. This is a result of the two one-way bearings 108, 110 being positioned to facilitate rotation in opposite directions and to resist rotation in opposite directions. Therefore, when the shaft 402 is rotated clockwise, the first one-way bearing 108 facilitates rotation of the shaft 402, but the second one-way bearing 110 resists the clockwise rotation. Similarly, when the shaft 402 is rotated counterclockwise, the second one-way bearing 110 facilitates rotation of the shaft 402, but the first one-way bearing 108 resists the counterclockwise rotation. Accordingly, an apparatus (not shown) coupled with the two one-way bearings 108, 110 rotates in either direction in response to respective rotation of the shaft 402 in either direction. Likewise, rotation in either direction of an apparatus coupled with the two one-way bearings 108, 110 can rotate the shaft 402 in the same direction. In still other examples, the shaft 402 may simply be inhibited from rotation in either direction, and no apparatus may be rotated.

Figure 5:
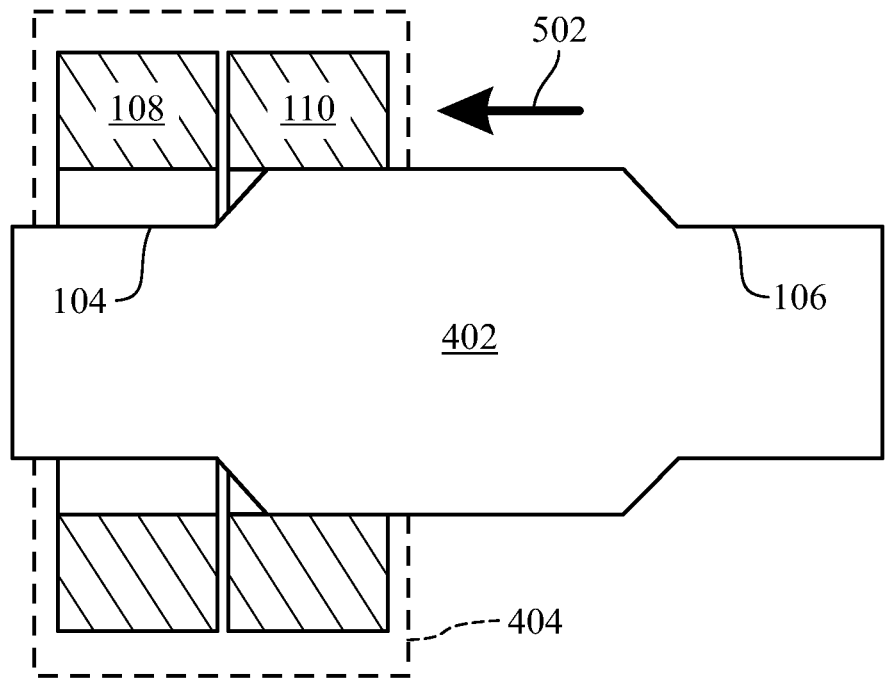
FIG. 5 is a cross-section block diagram of the shaft and bearing assembly of FIG. 4 with a first one-way bearing disposed over a depressed region.

Referring to FIG. 5, the first and second one-way bearings 108, 110 can be displaced axially on the shaft 402. In one example, the first and second one-way bearings 108, 110 may be moved in the direction of arrow 502 and/or the shaft 402 may be moved in a direction opposite the arrow 502. As shown, the first one-way bearing 108 can be positioned at least substantially around a depressed region, such as the first depressed region 104. When the first one-way bearing 108 is positioned at least substantially around a depressed region, at least part of the second one-way bearing 110 is still in contact with the shaft 402. In this instance, the shaft 402 will be free to rotate in the counterclockwise direction, since the second one-way bearing 110 is positioned to facilitate counterclockwise rotation. That is, the shaft 402 can rotate counterclockwise without rotating the one-way bearings 108, 110 and/or an apparatus coupled with the one-way bearings 108, 110. Likewise, an apparatus coupled with the two one-way bearings 108, 110 can be rotated clockwise without rotating the shaft 402.

When the shaft 402 is rotated clockwise, the second one-way bearing 110 resists the clockwise rotation of the shaft 402. In some examples, an apparatus coupled to the one-way bearings 108, 110 can be rotated clockwise in response to rotation of the shaft 402 in the first direction. In other examples, the shaft 402 can be rotated counterclockwise in response to counterclockwise rotation of an apparatus coupled to the one-way bearings 108, 110. In still other examples, the shaft 402 may be inhibited (e.g., locked) from clockwise rotation.

Figure 6:
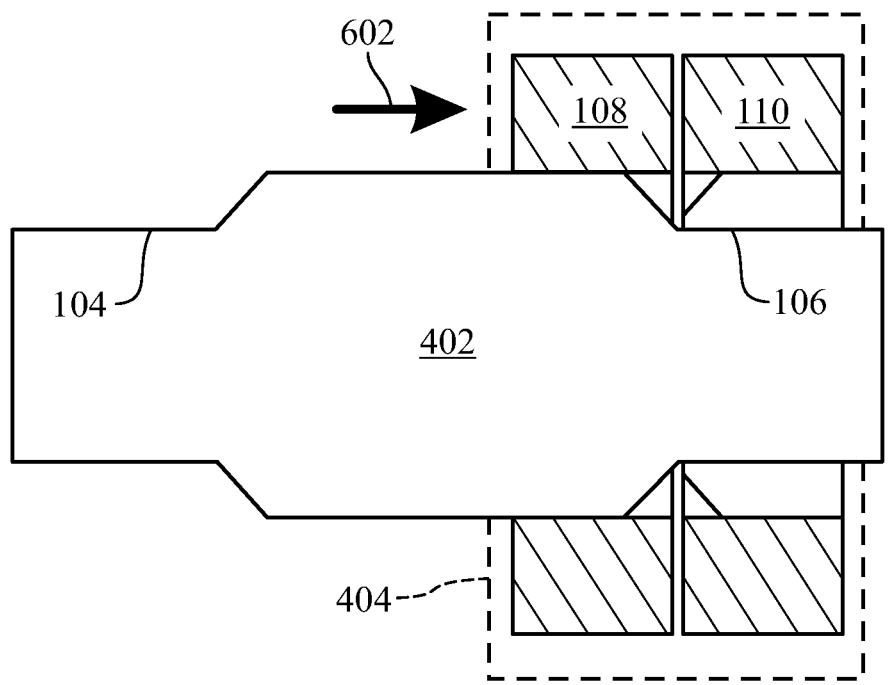
FIG. 6 is a cross-section block diagram of the shaft and bearing assembly of FIG. 4 with a second one-way bearing disposed over a depressed region.

Referring to FIG. 6, the first and second one-way bearings 108, 110 can be displaced axially on the shaft 402 until the second one-way bearing 110 is positioned at least substantially around a depressed region. In one example, the first and second one-way bearings 108, 110 may be moved in the direction of arrow 602 and/or the shaft 402 may be moved in a direction opposite the arrow 602. As shown, the second one-way bearing 110 can be positioned at least substantially around a depressed region, such as the second depressed region 106. When the second one-way bearing 110 is positioned at least substantially around a depressed region, at least part of the first one-way bearing 108 is still in contact with the shaft 402. In this instance, the shaft 402 will be free to rotate clockwise, since the first one-way bearing 108 is positioned to facilitate counterclockwise rotation, and the second one-way bearing 110 is not contacting the shaft 402. That is, the shaft 402 can rotate clockwise without rotating the one-way bearings 108, 110 and/or an apparatus coupled with the one-way bearings 108, 110. Likewise, an apparatus coupled with the two one-way bearings 108, 110 can be rotated counterclockwise without rotating the shaft 402.

When the shaft 402 is rotated counterclockwise, the first one-way bearing 108 resists the counterclockwise rotation of the shaft 402. In some examples, an apparatus coupled to the one-way bearings 108, 110 can be rotated counterclockwise in response to counterclockwise rotation of the shaft 402. In other examples, the shaft 402 can be rotated clockwise in response to clockwise rotation of an apparatus coupled to the one-way bearings 108, 110. In still other examples, the shaft 402 may be inhibited (e.g., locked) from counterclockwise rotation.

According to a feature of the disclosure, the first one-way bearing 108 and the second one-way bearing 110 can be disposed in a single housing 404 shown in FIG. 4-6 as an optional feature by broken lines. In such instances, the first and second one-way bearings 108, 110 can be packaged as a single bearing assembly. Such a single housing implementation may include other components not shown, such as additional support bearings referred to above.

Although various examples of a shaft with depressed regions have been shown and described, a person of ordinary skill in the art will recognize that other configurations may be employed. For example, a shaft may comprise only a single depressed region, and/or the first and second one-way bearings 108, 110 can be displaced so that one one-way bearing, neither one-way bearing, or both one-way bearings are positioned around a depressed region.

The features described above can be employed in a plurality of different applications. For instance, one non-limiting example includes tuning keys and tuner assemblies adapted for use with stringed musical instruments. As used herein, the term "tuner assembly" refers to an assembly of components that function in combination to adjust the pitch of an instrument's string. A tuner assembly may also be referred to by those of skill in the art as a machine tuner, or a machine head. The term "tuning key" refers to the knobs or pegs that can be rotated by a user of a musical instrument to adjust the pitch of an associated string. A tuning key may also be referred to by those of skill in the art as a tuning knob, a knob, a tuner, a peg, a tuning peg, etc.

Stringed musical instruments frequently require re-tuning due to stretching of the strings and slipping of the capstans. In order to re-tune the stringed musical instrument, it is necessary to hold the instrument so that sufficient pressure can be exerted on the tuning keys to homogeneously rotate the tuning keys and effect tuning of the instrument. It can be particularly difficult to tune an instrument when the tuning keys are in random positions, particularly when the tuning keys are in a difficult position for re-tuning (e.g., rotation) by the musician. Furthermore, musicians conventionally are unable to set the tuning keys in the position they prefer while playing the instrument, including the inability to align the tuning keys for cosmetic purposes according to a desired look.

Figure 7:
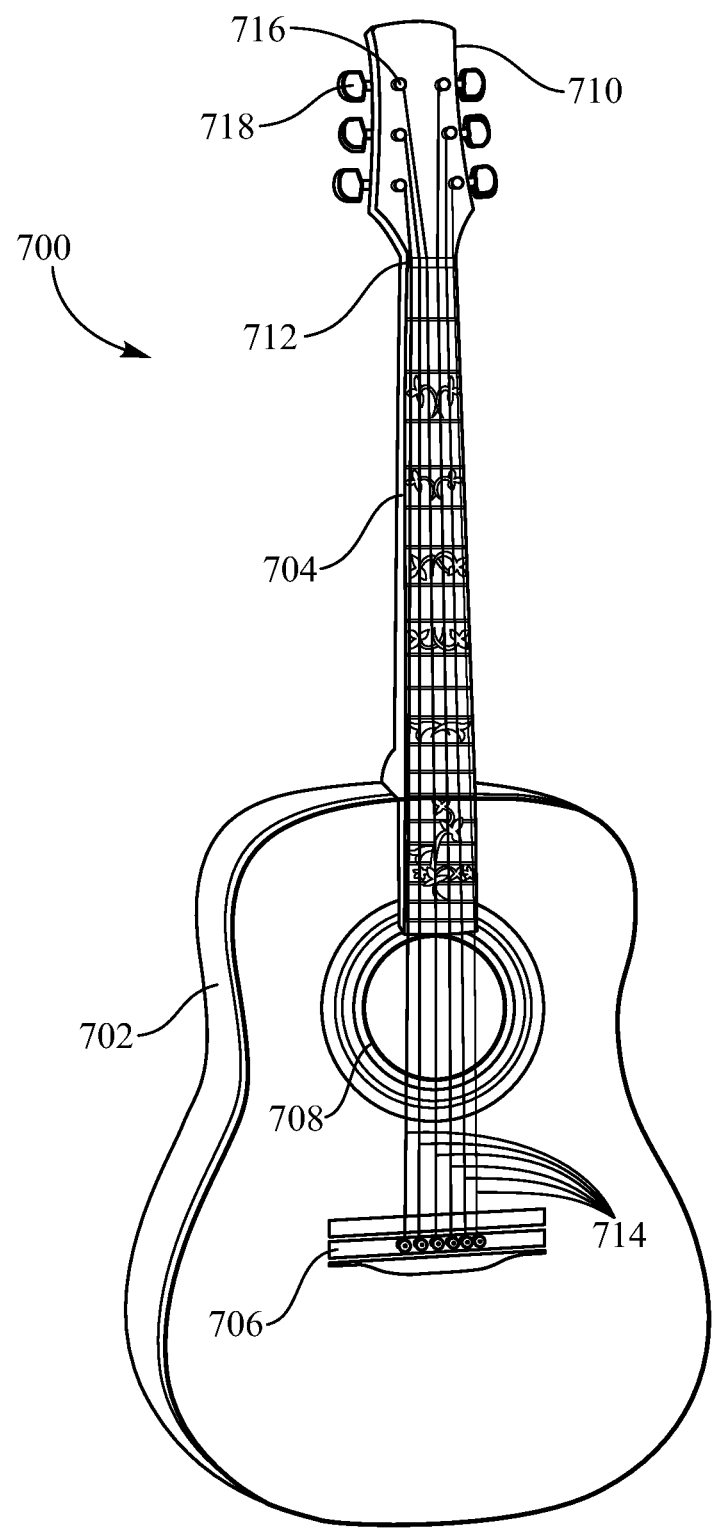
FIG. 7 is an isometric view of a stringed instrument embodied as a guitar according to at least one example.

Turning to FIG. 7, an isometric view is shown of a stringed instrument embodied as a guitar 700 according to at least one example. The guitar 700 generally includes a body 702 coupled with a neck 704. The body 702 may include a bridge 706, one or more sound holes 708 and/or one or more pickup devices (not shown) that may be employed for use with an electrical sound system.

The neck 704 extends away from the body 702 and may comprise a fretboard, (or fingerboard). At an end of the neck 704 opposite from the body 702 is a head (or headstock) 710, separated from the neck 704 by a nut 712. The head 710 includes various elements adapted for tuning a plurality of strings 714, which strings 714 can be coupled to the bridge 706 and extend over the body 702 and the neck 704 to capstans 716 disposed at the head 710. Each of the strings 714 is disposed through an aperture in a respective capstan 716 and wrapped around the capstan 716 to a particular tension for obtaining a desired pitch from the string 714.

Figure 8:
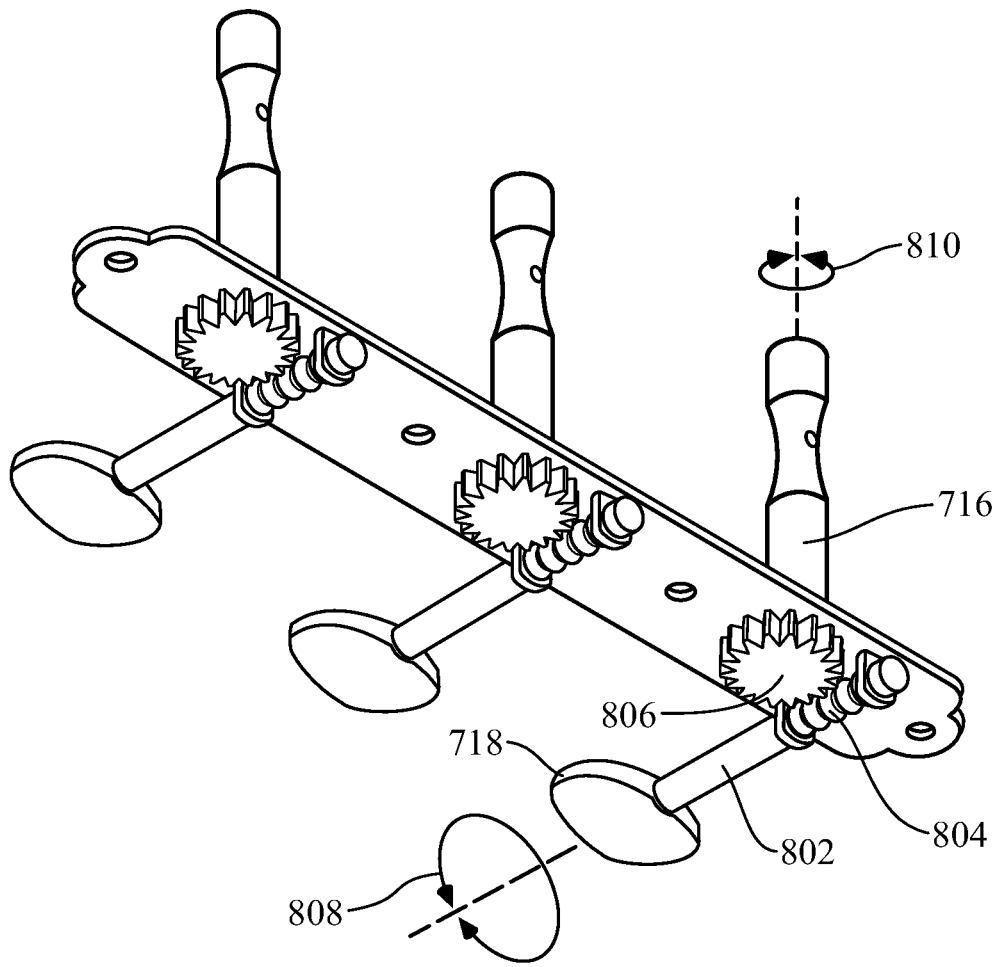
FIG. 8 shows an example of the interaction between the capstans and the tuning keys.

The capstans 716 are each adapted to rotate in response to rotation of a respective tuning key 718. For example, FIG. 8 shows an example of the interaction between the capstan 716 and the tuning keys 718. As shown, each tuning key 718 is coupled with a shaft 802 that includes a worm gear 804. The worm gear 804 is positioned in relation to a gear wheel 806, which is coupled with a respective capstan 716. When a tuning key 718 is rotated in the direction of arrow 808, the respective capstan 716 is also rotated in the direction of arrow 810, resulting in a tightening or loosening of a string wrapped around the respective capstan 716.

Figure 9:
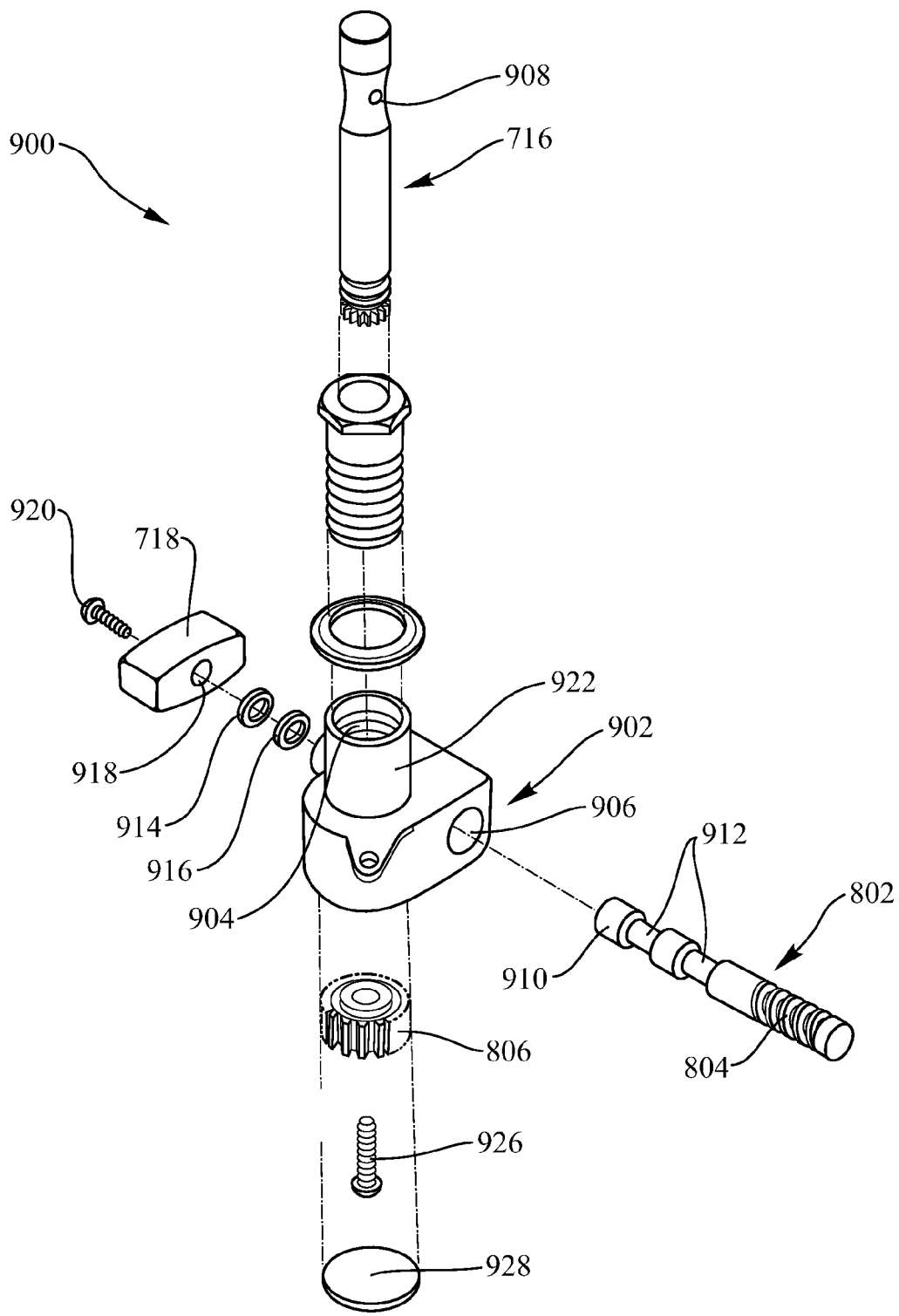
FIG. 9 is an exploded view of a tuner assembly according to at least one example adapted for a stringed instrument embodied as a guitar.

Employing an example of a shaft and bearing assembly according to one or more of the aspects described above, one or more tuning keys can be adapted for being rotationally repositioned in relation to the instrument's head (or headstock) without rotating the associated capstan. FIG. 9 is an exploded view of a tuner assembly 900 according to at least one example of the present disclosure. As shown, the tuner assembly 900 includes an enclosure 902 that has at least two apertures, a vertical sleeve aperture 904 and a horizontal aperture 906 communicating with each other. The vertical sleeve aperture 904 receives a capstan 716 used for adjusting the tension of a string disposed through a string aperture 908 by winding or unwinding the string thereon or therefrom. The horizontal aperture 906 receives the shaft 802 used for rotating the capstan 716.

The shaft 802 has a worm gear 804 at one end portion, and a tuning key portion 910 at the opposing end portion of the shaft 802. Therefore, when the shaft 802 is inserted into the horizontal aperture 906 of the enclosure 902, the gear wheel 806 is placed within the horizontal aperture 906, while the tuning key portion 910 protrudes outwardly from the enclosure 902 to a length. The shaft also includes two depressed regions 912 formed therein.

Two one-way bearings 914 and 916 are coupled to the tuning key 718 and fitted over the shaft 802, with each of the one-way bearings 914, 916 positioned to facilitate rotation in opposite directions and to resist rotation in opposite direction, as described above. The one-way bearings 914, 916 can be disposed within a bore 918 in the tuning key 718. A holding screw 920 is disposed into an internal thread of the shaft 802. In such a case, the screw 920 passes into the bore 918 of the tuning key 718. The tuning key 718 and the shaft 802 are thus integrated together while being rotatably assembled with the enclosure 902.

A vertical sleeve 922 projects upwardly from the top of the enclosure 902 and has the vertical sleeve aperture 904 therein, with an internal thread formed on the interior surface of the vertical sleeve aperture 904. A gear wheel 806 (e.g., a worm wheel) is placed within the enclosure 902 at a position to engage with the worm gear 804 of the shaft 802. In addition, a portion of the capstan 716 engages with the gear wheel 806. An internal thread is formed on the lower end portion of the capstan 716, thus allowing a second holding screw 926 to be coupled into the capstan 716 so as to assemble the gear wheel 806 with the capstan 716.

Accordingly, when the capstan 716 is inserted into the vertical sleeve aperture 904 of the enclosure 902, the lower portion of the capstan 716 is fitted into the gear wheel 806 prior to threading the screw 926 into the internal thread of the capstan 716. The capstan 716 and the gear wheel 806 are thus brought into engagement with each other while being rotatably held in the enclosure 902. The lower opening of the vertical sleeve aperture 904 can be closed by a cover 928, thus hiding the gear wheel 806 from the outside.

Figure 10:
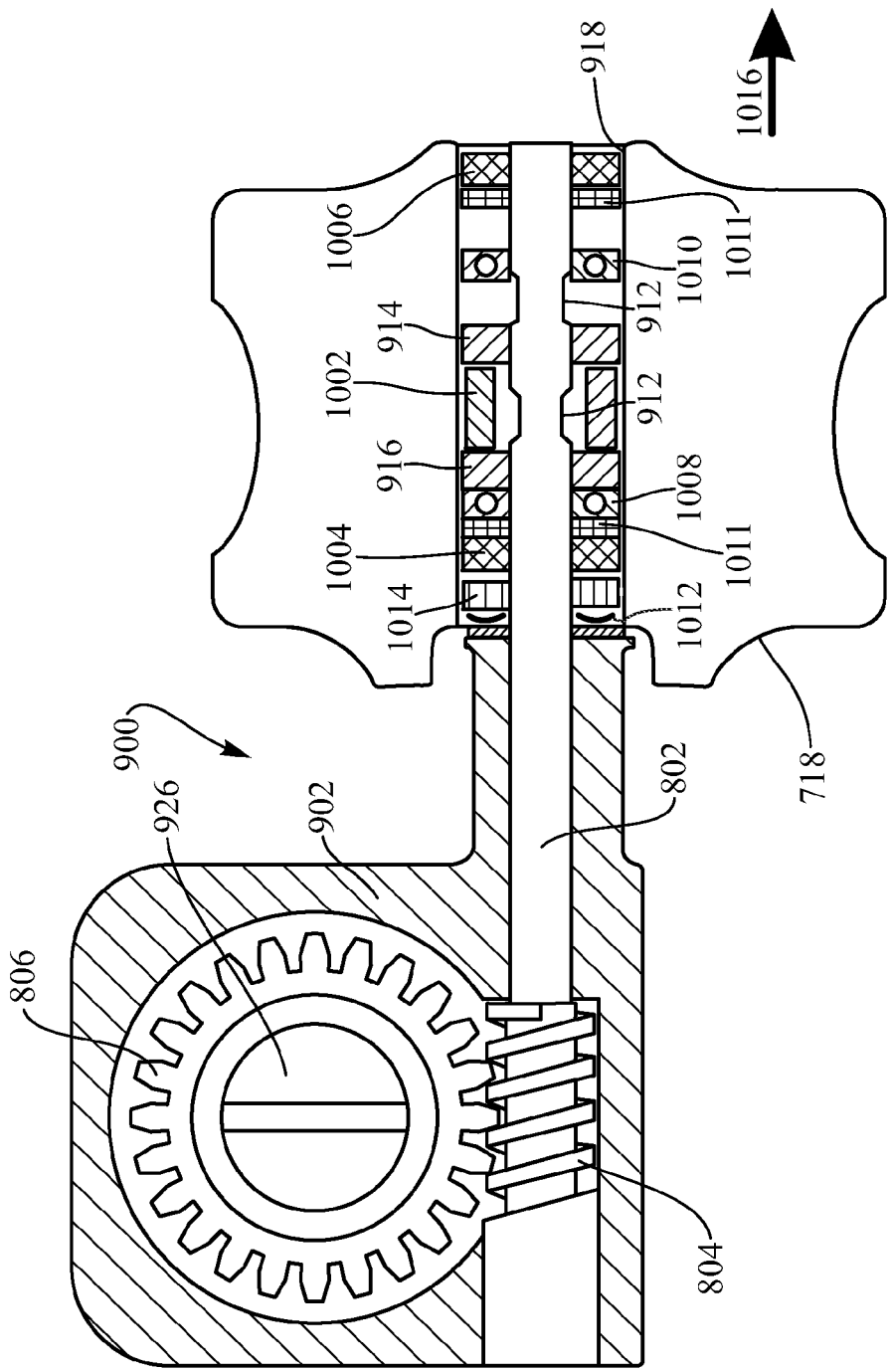
FIG. 10 is a cross-sectioned view of a portion of a tuner assembly according to at least one example with the tuning key in the engaged position.

Turning now to FIG. 10, a cross-sectioned view is illustrated showing a portion of a tuner assembly 900 according to at least one example. The example shows the tuner assembly 900 cross-section at the bottom portion looking upward. The enclosure 902 is shown with a gear wheel 806 positioned therein and retained by the holding screw 926. The gear wheel 806 is operably coupled with the worm gear 804 of the shaft 802. The shaft 802 extends from the enclosure 902 into the bore 918 of the tuning key 718. The portion of the shaft 802 positioned within the tuning key 718 includes two depressed regions 912. As noted previously, the depressed regions 912 include an area of the shaft 802 where the outer diameter is smaller than other portions of the shaft 802.

Within the tuning key 718, the first and second one-way bearings 914, 916 are disposed on the shaft 802. Between the two one-way bearings 914, 916, a spacer 1002 may be disposed. The spacer 1002 may be at least substantially the same width as a distance between the two depressed regions 912. Additional components may include one or more magnetic washers 1004 and 1006, additional support bearings 1008 and 1010, a silicone or rubber washer 1011, one or more spring washers 1012 disposed adjacent each other and facing in opposing directions, and a nut 1014.

In operation, when at least a portion of the two one-way bearings 914, 916 are in contact with the shaft 802, as shown by the example depicted in FIG. 10, any rotation of the tuning key 718 will also cause the shaft 802 to rotate. That is, the two one-way bearings 914, 916 can be displaced axially on the shaft 802 to at least a portion of each one-way bearing 914, 916 is not located around a depressed region 912. In this engaged position, rotation of the tuning key 718 will affect rotation of the capstan (not shown), which rotation of the capstan will change the pitch of a string coupled to the capstan of the tuner assembly 900. The magnetic washer 1004 can retain the tuning key 718 in the engaged position so that the one-way bearings 914, 916 will at least partially contact the shaft 802. As shown, the one-way bearings 914, 916 may fully contact the shaft 802, although it will be clear to those of ordinary skill in the art that the one-way bearings 914, 916 can be positioned so that only a portion of each one-way bearing 914, 916 is in contact with the shaft 802 in some examples. That is, the one-way bearings 914, 916 can be positioned on the shaft 802 such that the one-way bearings 914, 916 are partially contacting the shaft 802 and partially location around the depressed regions 912. In some examples, in addition to the magnetic washer 1004 or in alternative thereto, a spring (not shown) can be disposed between the support bearing 1010 (or the one-way bearing 914) and an inner surface of the bore 918 so as to apply a force pushing the one-way bearings 914, 916 (and the tuning key 718) in a direction opposite of the arrow 1016.

Figure 11:
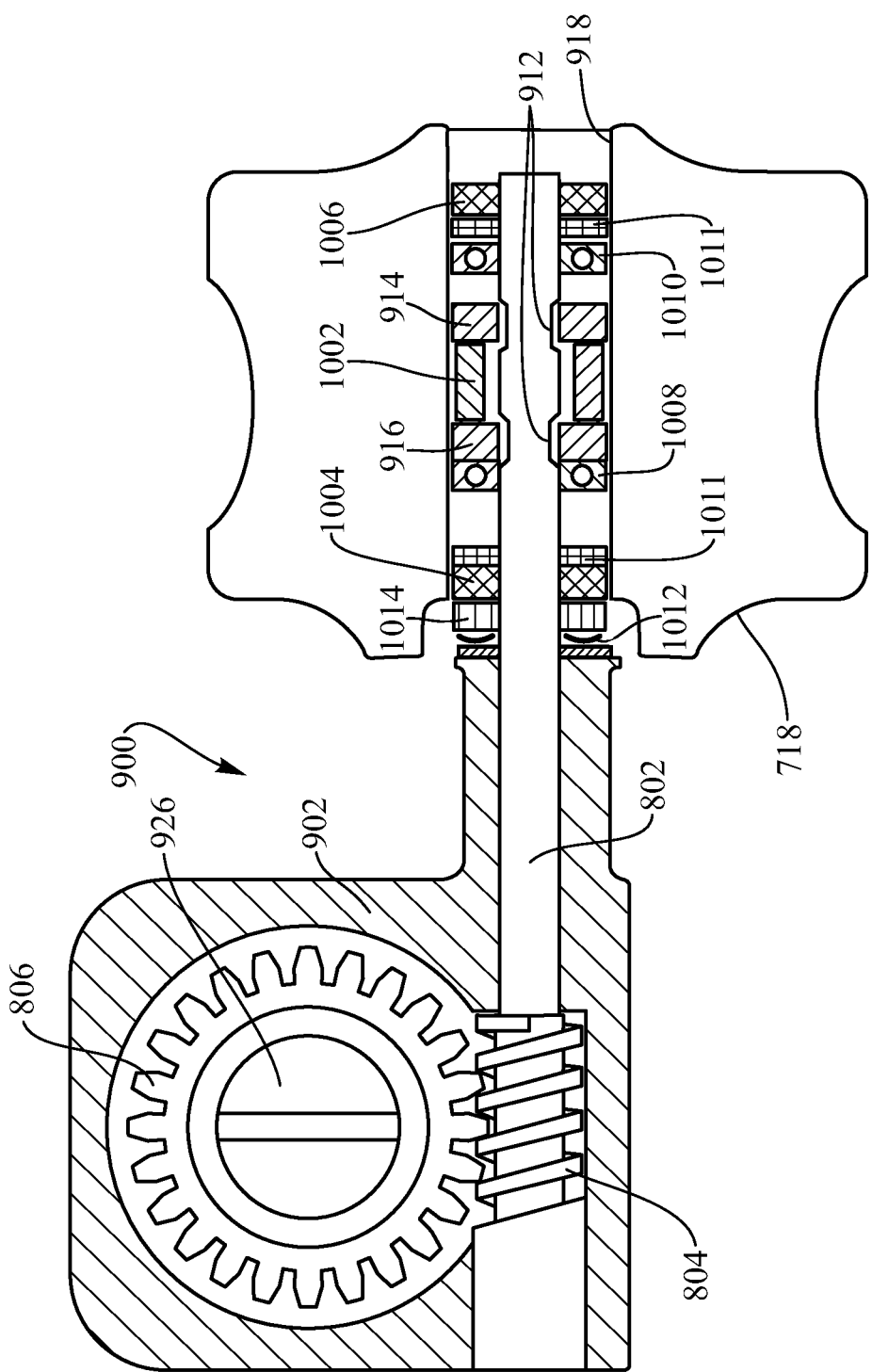
FIG. 11 is a cross-sectioned view of a portion of the tuner assembly of FIG. 10 with the tuning key in the disengaged position, to enable rotation of the tuning key without affecting the pitch of the instrument.

When the tuning key 718 is displaced in the direction of arrow 1016, the one-way bearings 914, 916 displace in the same direction in relation to the shaft 802 so that each of the one-way bearings 914, 916 is positioned around a respective depressed region 912, as shown in FIG. 11. When the two one-way bearings 914, 916 are positioned over a depressed region 912, the tuning key 718 is free to rotate about the shaft 802 without causing the shaft 802 to rotate. Accordingly, the tuning key 718 can be repositioned (e.g., rotated) as desired without rotating the shaft 802 and without causing the pitch of a string coupled to the tuner assembly 900 to be changed. In other words, when the tuning key 718 is turned it turns freely on the shaft 802, thus allowing the tuning key 718 to be rotated to any position desired without adjusting the tuning of a respective string.

The tuning key 718 can be locked on the shaft by pushing it in to the engaged positioned depicted in FIG. 10. The amount of axial displacement between the engaged and disengaged positions may be about 5/64 (0.080) of an inch in at least some examples. The tuning key 718 is held in the engaged or disengaged positions by the separate magnetic rings (washers) 1004 and 1006 on the shaft 802. One magnetic ring 1006 is outer and one magnetic ring 1004 is inner on the shaft 802. That is, the two magnetic rings 1006, 1004 can be positioned on the shaft 802 such that the two one-way bearings 914, 916 are position on the shaft between the two magnetic rings 1006, 1004. The inner magnetic ring 1004 and the outer magnetic ring 1006 can be coupled to the shaft 802.

A shaft preload can be accomplished by employing the two spring washers 1012 on the shaft 802 between the tuning key 718 and the enclosure 902. Tension on the spring washers 1012 is accomplished by employing the nut 1014 on the tuning key side of the spring washers 1012. The shaft preload (resistance of the shaft 802 to turn in the tuner assembly 900) can be accomplished by adjusting the nut 1014, and then sealing the threads with a sealant such as one of the sealants sold under the trademark LOCTITE or SUPER GLUE.

It is noted that, although the shaft 802 is shown throughout as a single piece forming the entire shaft 802, other embodiments may include a portion of the shaft 802 that is disposed in the tuning key 718 and that can be coupled to a separate portion of the shaft 802 that includes the gears formed thereon.

Figure 12:
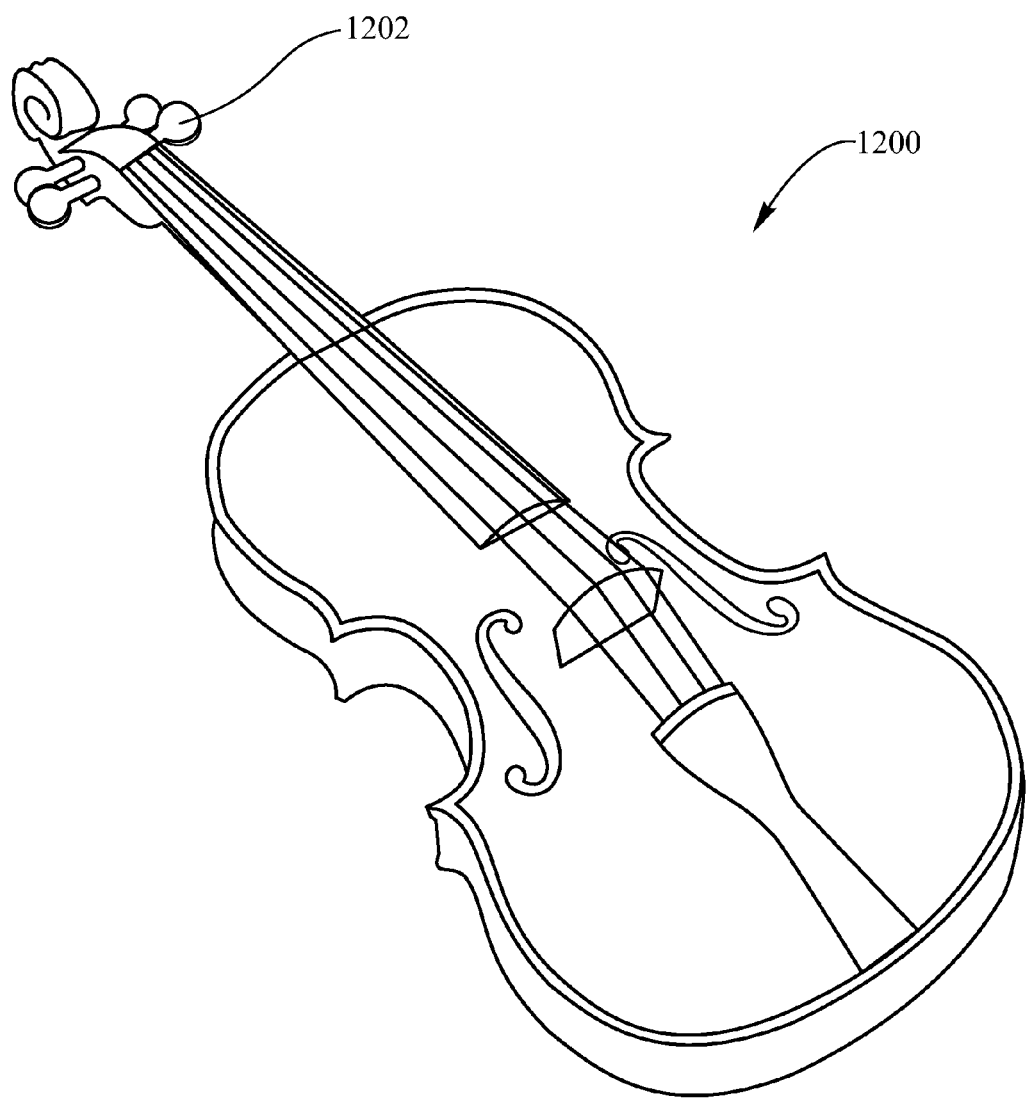
FIG. 12 is an isometric view of a stringed instrument embodied as a violin according to at least one example.

Although the forgoing example uses a guitar for illustrative purposes, one or more of the features described are equally applicable to any stringed musical instrument. For example, one or more of the described features may be employed in a violin, viola, cello, banjo, etc. By way of illustration, FIG. 12 shows an isometric view of a violin 1200 according to at least one example. The violin 1200 includes a tuner assembly 1202. FIG. 12 shows a cross-sectioned view of a tuner assembly 1202 adapted for use with a violin 1200, or other similar stringed instrument (e.g., viola, cello, etc.). As shown, the tuner assembly 1202 includes a tuning key 1302 coupled with a peg 1304. In this example, the tuning key 1302 can be coupled with the peg 1304 by the shaft 1306. The shaft 1306 may be threaded into the peg 1304, glued to the peg 1304, integral with the peg 1304, etc. The shaft 1306 extends into the tuning key 1302 and includes one or more depressed regions 1308. A first one-way bearing 1310 and a second one-way bearing 1312 are coupled to the tuning key 1302 and positioned on the shaft 1306 in opposite directions, as already described herein. Additionally, magnetic washers 1314, silicone or rubber washers 1316, ball bearings 1318, and/or a spacer 1320 may be included as shown.

As described above, when the tuning key 1302 is displaced axially along the shaft 1306 so the first and second one-way bearings 1310, 1312 are positioned over a depressed region 1308, the tuning key 1302 can rotate clockwise and counterclockwise without moving the shaft 1306. When the tuning key 1302 is displaced axially along the shaft 1306 so the first and second one-way bearings 1310, 1312 are not positioned over a depressed region 1308, the opposite facing one-way bearings 1310, 1312 will lock the shaft 1306. As a result rotation of the tuning key 1302 can rotate the shaft 1306, and the peg 1304, causing a string attached to the peg 1304 to be tightened or loosened.

In addition to the tuning key and tuner assembly examples described above, one or more features of the present disclosure can also be employed in a plurality of other applications. For instance, another non-limiting example includes a socket wrench for enabling the wrench to freely rotate in one direction without turning a nut and to rotate in an opposite direction while also turning a nut. Such a wrench may include the shaft and one-way bearings positioned at least partially within the handle portion thereof. Such a wrench employing an embodiment of the shaft and bearing assemblies described herein has relatively little to no play (i.e., free movement) prior to locking for turning in the opposite direction. A selector can be employed on the socket wrench for displacing the first and second one-way bearings in relation to the shaft so that the socket wrench can be employed for tightening, loosening, or both.

Figure 14:
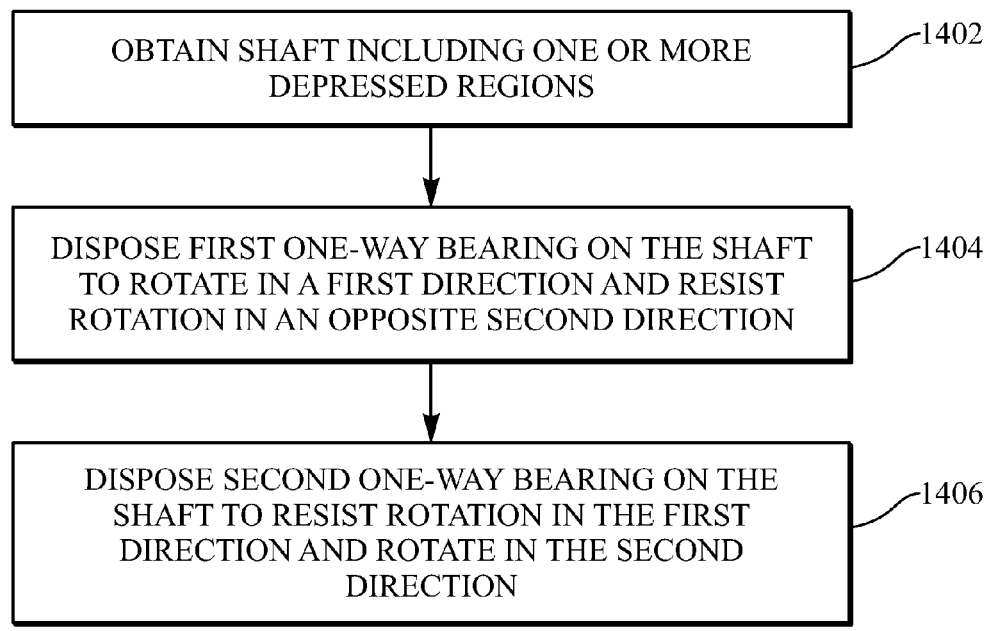
FIG. 14 is a flow diagram illustrating at least one example of a method of making a shaft and bearing assembly.

According to at least one other feature of the present disclosure, methods of making a shaft and bearing assembly are also disclosed. FIG. 14 is a flow diagram illustrating at least one example of a method of making a shaft and bearing assembly. With reference to FIG. 14, as well as one or more of the components illustrated in FIGS. 1 through 6, a shaft 102, 402 can be obtained at step 1402. The shaft 102, 402 includes one or more depressed regions 104, 106. In at least one implementation, the shaft 102, 402 may be obtained by forming the shaft 102, 402 with the one or more depressed regions 104, 106. Such a shaft 102, 402 may be formed by machining, casting, molding, or any other suitable fabrication technique or combination thereof according to the particular materials used.

At step 1404, a first one-way bearing 108 can be disposed on the shaft 102, 402 so that the first one-way bearing 108 facilitates clockwise rotation and resists counterclockwise rotation. At step 1406, a second one-way bearing 110 is also disposed on the shaft 102, 402 so that the second one-way bearing 110 facilitates counterclockwise rotation and resists clockwise rotation. In some implementation, the first one-way bearing 108 and the second one-way bearing 110 are disposed on the shaft 102, 402 in a single housing 114, 404. The first one-way bearing 108 and the second one-way bearing 110 are disposed in the shaft 102, 402 in a manner so that they are able to move axially along the shaft 102, 402.

According to various implementations, additional components may also be included in the shaft and bearing assembly. For example, a spacer, such as the spacer 1002 in FIGS. 10 and 11, may be positioned between the first one-way bearing 108 and the second one-way bearing 110. In some implementations, the spacer can be sized to separate the first and second one-way bearings 108, 110 a distance equal to a distance separating two depressed regions 104, 106 so that the first and second one-way bearings 108, 110 will both be disposed around the depressed regions 104, 106 or away from the depressed regions 104, 106 at the same time. In other implementations, the spacer can be sized to separate the first and second one-way bearings 108, 110 a distance so that when one one-way bearing is positioned around a depressed region 104, 106, the other one-way bearing is not positioned around a depressed region 104, 106.

Figure 13:
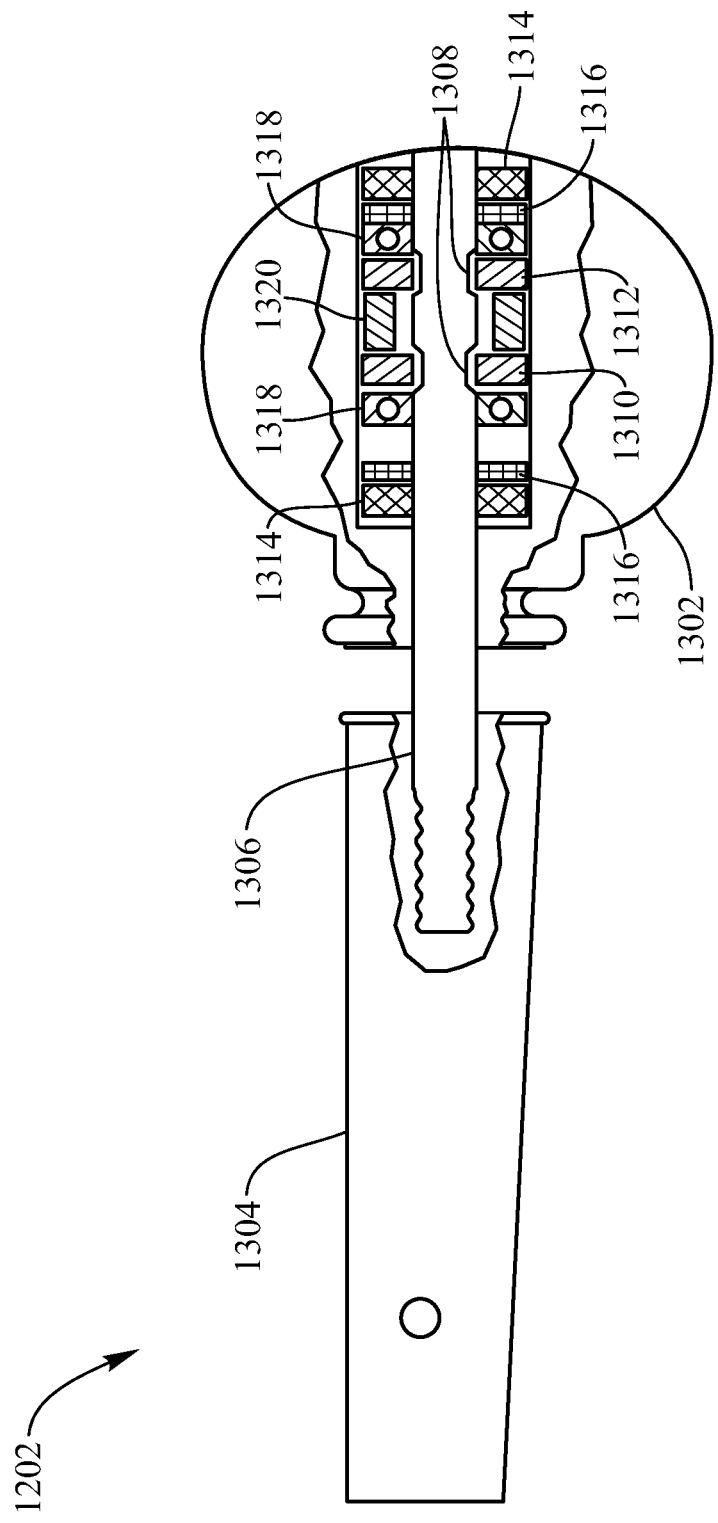
FIG. 13 is a cross-sectioned view of a portion of a tuner assembly according to at least one other example with the tuning key in the disengaged position.

In some examples, such as implementations where the shaft and bearing assembly are adapted for use with a tuning key, first and second magnetic washers (e.g., magnetic washers 1004, 1006, 1314 in FIGS. 10, 11, and 13) may be coupled to the shaft 102. The first and second magnetic washers may be positioned on the shaft 102 with the first and second one-way bearings 108, 110 positioned therebetween.

It is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A shaft and bearing assembly, comprising:
   a shaft comprising at least one circumferential depressed region;
   a first one-way bearing disposed on the shaft, the first one-way bearing positioned to facilitate free clockwise rotation of the shaft and to resist free counterclockwise rotation of the shaft when at least a portion of the first one-way bearing is not positioned around the at least one depressed region of the shaft; and
   a second one-way bearing disposed on the shaft axially displaced from the first one-way bearing, the second one-way bearing positioned to facilitate free counterclockwise rotation of the shaft and to resist free clockwise rotation of the shaft when at least a portion of the second one-way bearing is not positioned around the at least one depressed region of the shaft;
   wherein the shaft is inhibited from free rotation when at least a portion of the first and second one-way bearings are not positioned around the depressed region of the shaft, is free to rotate counterclockwise when the first one-way bearing is positioned around the depressed region of the shaft, and is free to rotate clockwise when the second one-way bearing is positioned around the depressed region of the shaft.

2. The assembly of claim 1, further comprising:
   a tuning key adapted for use with a stringed instrument, wherein the tuning key is coupled to the first one-way bearing and the second one-way bearing, and the shaft is disposed within an aperture of the tuning key.

3. The assembly of claim 2, further comprising:
   a first magnetic washer coupled to the shaft; and
   a second magnetic washer coupled to the shaft, wherein the first one-way bearing and the second one-way bearing are position between the first magnetic washer and the second magnetic washer.

4. The assembly of claim 1, further comprising:
   a capstan adapted to receive an instrument string;
   a gear wheel operably coupled to the capstan to facilitate rotational turning of the capstan;
   wherein the shaft further comprises a worm gear operably coupled to the gear wheel to rotate the gear wheel in response to rotation of the shaft; and
   a tuning key disposed over a portion of the shaft.

5. The assembly of claim 1, further comprising:
a housing at least substantially enclosing the first one-way bearing and the second one-way bearing.

6. The assembly of claim 1, wherein the shaft comprises at least two depressed regions.

7. The assembly of claim 6, wherein the first one-way bearing and the second one-way bearing are axially displaced a distance equal to a distance separating the at least two depressed regions.

8. A method of operating a shaft and bearing assembly, where a shaft includes one or more circumferential depressed regions, and where a first one-way bearing and a second one-way bearing are positioned axially displaced from each other on the shaft in a manner to resist respectively opposite one-way rotation when at least a portion of each respective one-way bearing is not positioned around the one or more depressed regions, the method comprising:
axially displacing the first one-way bearing and the second one-way bearing on the shaft so the first one-way bearing and the second one-way bearing are positioned around one or more depressed regions of the shaft; and
rotating the first one-way bearing and the second one-way bearing without rotating the shaft.

9. The method of claim 8, wherein:
axially displacing the first one-way bearing and the second one-way bearing on the shaft comprises displacing a tuning key axially along the shaft, the tuning key coupled to the first one-way bearing and the second one-way bearing; and
rotating the first one-way bearing and the second one-way bearing without rotating the shaft comprises rotating the tuning key without rotating the shaft.

10. The method of claim 9, wherein displacing the tuning key axially along the shaft comprises:
displacing the tuning key until the displaced tuning key is retained in position by a magnetic washer.

11. The method of claim 8, further comprising:
axially displacing the first one-way bearing and the second one-way bearing on the shaft so at least a portion of the first one-way bearing is not located around a depressed region of the shaft and at least a portion of the second one-way bearing is also not located around a depressed region of the shaft; and
rotating the shaft in response to rotation of the first one-way bearing and the second one-way bearing.

12. The method of claim 11, wherein axially displacing the first one-way bearing and the second one-way bearing on the shaft so the first one-way bearing is not located around a depressed region of the shaft and the second one-way bearing is also not located around a depressed region of the shaft comprises:
displacing a tuning key axially along the shaft until the first one-way bearing is not located around a depressed region of the shaft and the second one-way bearing is also not located around a depressed region of the shaft.

13. The method of claim 12, further comprising:
rotating the tuning key, wherein the shaft is rotated in response to rotation of the tuning key.

14. A method of making a shaft and bearing assembly, the method comprising:
forming a shaft including at least one circumferential depressed region;
disposing a first one-way bearing on the shaft so that the first one-way bearing facilitates free rotation of the shaft in a first direction and resists free rotation of the shaft in an opposing second direction when at least a portion of the first one-way bearing is not positioned around the at least one depressed region of the shaft; and
disposing a second one-way bearing on the shaft axially offset from the first one-way bearing and positioned so that the second one-way bearing facilitates free rotation of the shaft in the second direction and resists free rotation of the shaft in the first direction;
wherein the shaft is inhibited from free rotation when at least a portion of the first and second one-way bearings are not positioned around the depressed region of the shaft, is free to rotate in the second direction when the first one-way bearing is positioned around the depressed region of the shaft, and is free to rotate in the first direction when the second one-way bearing is positioned around the depressed region of the shaft.

15. The method of claim 14, wherein forming the shaft including at least one depressed region comprises:
forming the shaft including two depressed regions.

16. The method of claim 15, further comprising:
positioning the first one-way bearing and the second one-way bearing on the shaft with a separation equal to a distance separating the two depressed regions.

17. The method of claim 15, further comprising:
positioning the first one-way bearing and the second one-way bearing on the shaft with a separation such that when one bearing is positioned around a depressed region the other bearing is not positioned around a depressed region.

18. The method of claim 14, wherein disposing the first one-way bearing on the shaft, and disposing the second one-way bearing on the shaft comprises:
disposing a housing on the shaft, the housing comprising the first one-way bearing and the second one-way bearing.

19. The method of claim 14, further comprising:
disposing a tuning key adapted for use with a stringed instrument over the first one-way bearing and the second one-way bearing on the shaft.

20. The method of claim 19, further comprising:
coupling a first magnetic washer to the shaft; and
coupling a second magnetic washer to the shaft;
wherein the first and second magnetic washers are positioned on the shaft with the first one-way bearing and the second one-way bearing therebetween.

* * * * *